United States Patent [19]

Scott

[11] Patent Number: 4,524,274
[45] Date of Patent: Jun. 18, 1985

[54] METHODS AND APPARATUS FOR INVESTIGATING AN EARTH FORMATION AND COMPENSATING FOR BOREHOLE ENVIRONMENTAL EFFECTS

[75] Inventor: Hubert D. Scott, Houston, Tex.

[73] Assignee: Schlumberger Technology Corporation, New York, N.Y.

[21] Appl. No.: 405,391

[22] Filed: Aug. 5, 1982

[51] Int. Cl.³ ............................................. G01V 5/10
[52] U.S. Cl. ...................................... 250/269; 250/262
[58] Field of Search ................ 250/269, 265, 256, 262

[56] References Cited

U.S. PATENT DOCUMENTS

| | | | |
|---|---|---|---|
| 3,483,376 | 12/1969 | Locke et al. | 250/392 |
| 3,508,438 | 4/1970 | Alger et al. | 73/152 |
| 3,538,329 | 11/1970 | Niven | 250/261 X |
| 3,566,117 | 2/1971 | Tixier | 250/264 |
| 3,567,935 | 3/1971 | Nagel | 250/264 |
| 3,662,172 | 5/1972 | Youmans | 250/268 |
| 4,035,639 | 7/1977 | Boutemy et al. | 250/264 |
| 4,423,323 | 12/1983 | Ellis et al. | 250/264 |

FOREIGN PATENT DOCUMENTS

| | | | |
|---|---|---|---|
| 954638 | 9/1974 | Canada. | |
| 2089027 | 6/1982 | United Kingdom | 250/269 |

OTHER PUBLICATIONS

John C. Stick, Jr., Gilbert Swift, Ralph Hartline, "A Review of Current Techniques in Gamma-Ray and Neutron Log Interpretation", *Journal of Petroleum Technology*, (Mar. 1962), pp. 233–241.

An article from: Fourth Annual Logging Symposium Transactions on May 23–24, 1963, Oklahoma City, OK, "Formation Evaluation with Nuclear and Acoustic Logs", by F. Lebreton, A. H. Youmans, H. I. Oshry and B. F. Wilson.

*Primary Examiner*—Janice A. Howell
*Assistant Examiner*—Constantine Hannaher
*Attorney, Agent, or Firm*—Brumbaugh, Graves, Donohue & Raymond

[57] ABSTRACT

In the illustrative embodiment of the invention disclosed, a neutron porosity logging tool adapted to log a mud-filled borehole includes one or more pairs of epithermal and/or thermal neutron detectors. The detector count rates are corrected to the effective count rates for fresh water in the borehole by applying thereto empirically-derived correction terms that are functionally related to the hydrogen index of the mud and, in the case of thermal detectors, also to the thermal neutron absorption properties in the mud.

36 Claims, 3 Drawing Figures

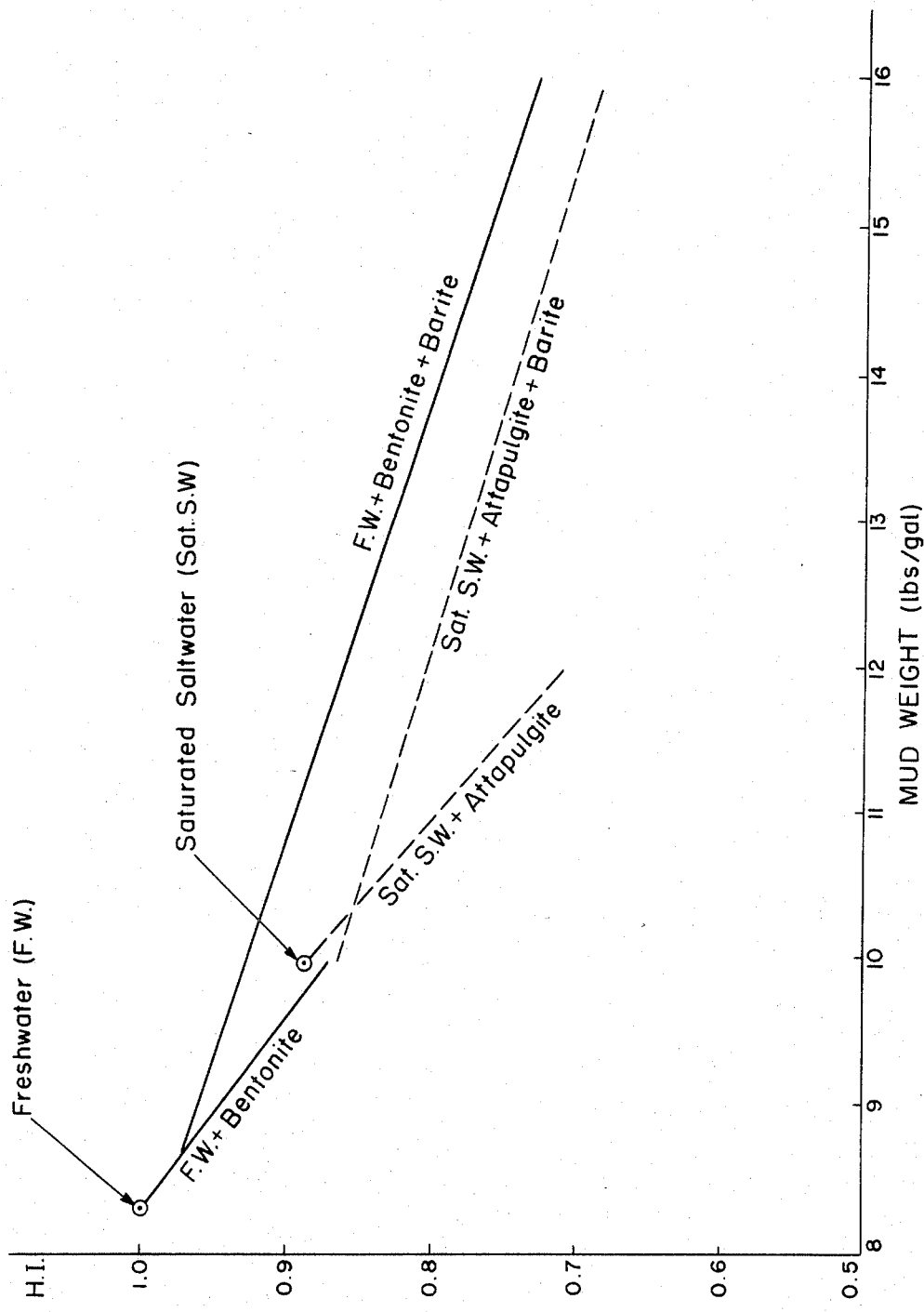

METHODS AND APPARATUS FOR INVESTIGATING AN EARTH FORMATION AND COMPENSATING FOR BOREHOLE ENVIRONMENTAL EFFECTS

BACKGROUND OF THE INVENTION

1. Field of the Invention

This invention relates to neutron logging method and apparatus for investigating an earth formation surrounding a mud-filled borehole and determining characteristics of the earth formation. More specifically, the invention permits a more accurate determination of earth formation characteristics, such as porosity, by compensating neutron logging measurements for borehole mud effects.

2. Description of the Prior Art

Knowledge of the porosity of earth formations surrounding a borehole is important in the petroleum industry to identify possible oil and gas producing regions, to determine whether hydrocarbon gas is present, and to calculate the maximum producible oil index of a formation and other parameters. The porosity of a formation is typically measured by passing a neutron logging tool through the borehole.

Generally, known porosity logging tools have used a high-energy neutron source and two (or more) thermal neutron detectors spaced at different distances from the source. Tools of this sort are described in detail in U.S. Pat. No. 3,483,376, issued to S. Locke on Dec. 9, 1969, and U.S. Pat. No. 3,566,117, issued to M. Tixier on Feb. 23, 1971. In order to determine porosity, a count rate signal from a thermal neutron detector located closer to the neutron source is compared by a ratio circuit to a count rate signal from a thermal neutron detector located farther from the neutron source. This ratio is then converted by a function former or like circuit to a signal representative of formation porosity. Although "ratio porosity" measurements have the advantage that first-order environmental effects on the individual thermal neutron detector signals tend to cancel, residual borehole effects remain which must be corrected by departure curves. These corrections can be positive or negative, depending on the parameter involved and tool design. Certain corrections will be more significant than others. Moreover, the presence of thermal neutron absorbers in the formation and/or borehole complicates interpretation of the ratio porosity signals, and could possibly mask tool response to hydrocarbon gas, especially in shaly formations.

The foregoing and other difficulties encountered with known thermal neutron porosity tools are described at greater length in the copending commonly-owned U.S. patent application Ser. No. 300,418, filed Sept. 9, 1981 by D. Ellis and C. Flaum for Neutron Logging Method and Apparatus for Determining a Formation Characteristic Free of Environmental Effects, now U.S. Pat. No. 4,423,323, issued Dec. 27, 1983 to Ellis et al. Application Ser. No. 300,418 describes improved methods and apparatus for overcoming certain of the residual borehole effects, such as tool standoff and borehole size, in real time so as to provide a more accurate on-line porosity measurement. In the technique there described, two thermal or epithermal neutron detectors are located at different distances from the neutron source. Each detector signal is processed independently from the other detector signal and is separately compensated for the effects of borehole size and tool standoff. The neutron signals are then used with tabulated information to determine formation porosity. Although this "signal processing" technique affords improved results relative to the prior art, it has been determined in accordance with the present invention that still better results can be attained by additionally compensating the detector signals for the effects thereon of the borehole mud.

SUMMARY OF THE INVENTION

Accordingly, it is an object of the invention to provide more accurate neutron logging measurements, and in particular neutron porosity measurements, by compensating such measurements for borehole mud effects.

It is another object of the invention to provide improved methods and apparatus for compensating neutron porosity measurements for borehole mud effects, whether such measurements are derived using epithermal or thermal neutron detectors.

These and other objects of the invention are attained in accordance with the invention by the provision of methods and apparatus for investigating earth formations, wherein at least one pair of neutron detectors are spaced at different distances from a neutron source and wherein the detector count rates are individually corrected for mud effects on the detected neutron populations by the application thereto of an empirically-derived correction term which is functionally related to the effectiveness of the borehole mud as a neutron moderator. In the preferred form, the mud correction term is functionally related to the hydrogen index of the mud, where the hydrogen index is determined as a function of mud density, pressure, temperature and salinity. The mud-corrected detector signals afford more accurate measurements of true formation characteristics, such as porosity.

The detectors preferably are sensitive to epithermal neutrons, but may be of the thermal neutron type if desired. Alternatively, detectors of both types may be included in the logging tool. Where epithermal detectors are employed, the mud correction applied to the detector count rates is preferably $e^{-a(1-HI)}$, where HI is the hydrogen index of the borehole mud and a is a function of logging tool standoff. In the case of thermal detectors, the foregoing correction is applied and the term $e^{b(\Sigma_M c - \Sigma_W d)}$ is applied as an additional correction, where b, c and d are empirically derived fitting constants and $\Sigma_M$ and $\Sigma_W$ are the thermal neutron absorption cross sections of the mud and fresh water, respectively.

The logging tool may also advantageously include a provision for measuring tool standoff. The standoff values thus obtained may be used to select an appropriate value of a for use in correcting the detector count rates.

Although the mud correction techniques of the present invention afford particular advantages when used in an on-line system, the technique can also be applied at a remote site to previously recorded data.

BRIEF DESCRIPTION OF THE DRAWINGS

The objects and advantages of the present invention may be better understood by reference to the following description of an exemplary embodiment thereof, taken in conjunction with the accompanying drawings, in which:

FIG. 3 is a plot of mud hydrogen index versus mud weight for various muds.

DETAILED DESCRIPTION OF THE PREFERRED EMBODIMENT

Figure 1:
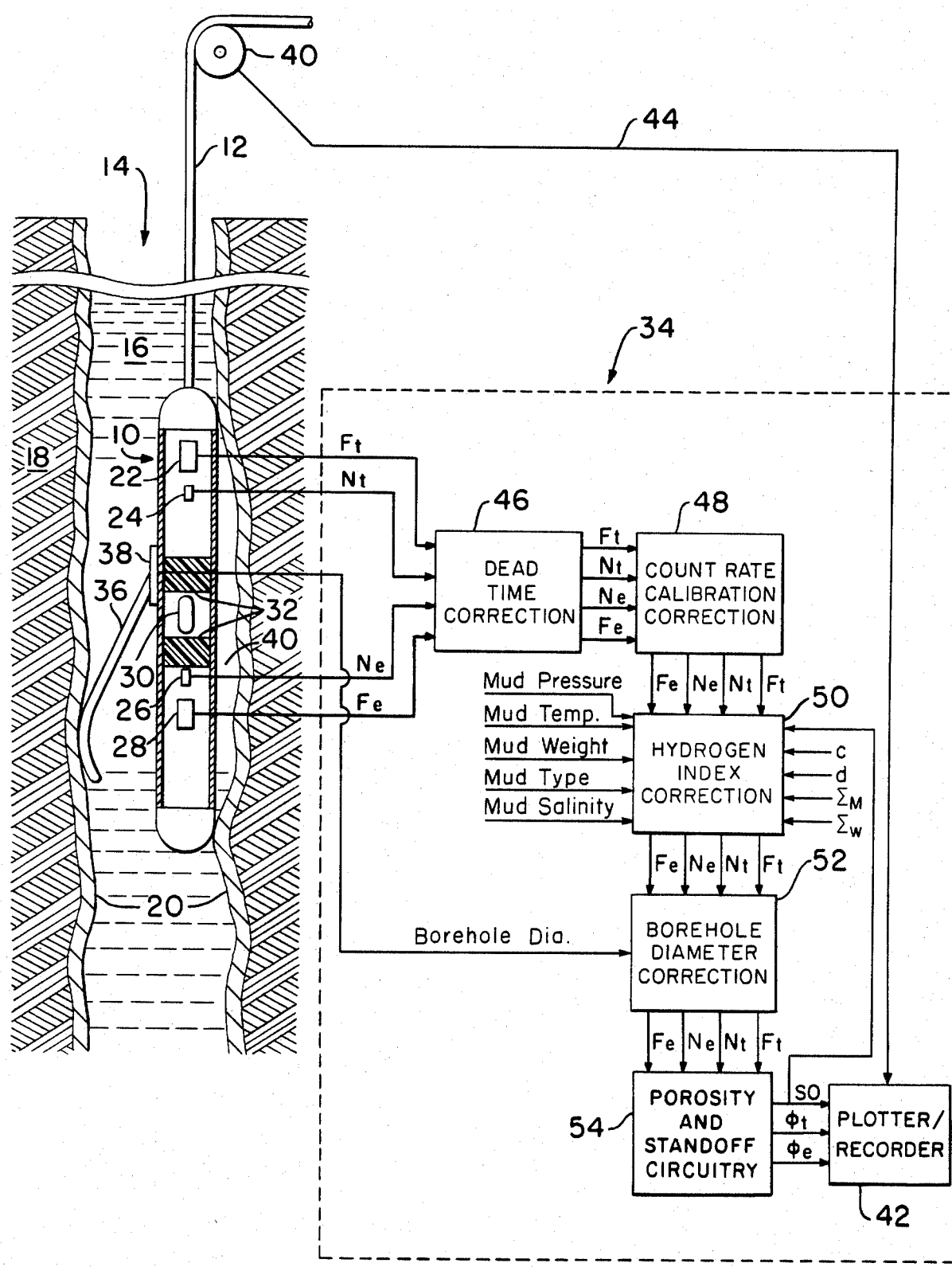
FIG. 1 is a schematic diagram of a system for investigating an earth formation surrounding a mud-filled borehole in which signals from neutron detectors are compensated for borehole environmental effects, including mud effects.

An illustrative embodiment of an apparatus embodying the principles of the invention is shown in FIG. 1. The borehole logging tool, or sonde, 10 is suspended by an armored cable 12 in a borehole 14. The borehole is filled with drilling mud 16 and is surrounded by earth formations 18. During drilling, the drilling mud deposits a solid layer of material on the borehole wall in the form of a mudcake 20.

The sonde 10 is depicted as containing two detector pairs, the upper pair including a far-spaced thermal neutron detector 22 and a near-spaced thermal neutron detector 24, and the lower pair including a near-spaced epithermal neutron detector 26 and a far-spaced epithermal neutron detector 28. It will be understood, however, that this is for illustrative purposes only, and that, if desired, just two thermal detectors or just two epithermal detectors could be provided. Alternatively, several thermal and/or epithermal detectors could be used. The detectors may comprise conventional thermal and epithermal detectors, respectively, and suitably may be of the $He^3$ or $BF_3$ gas-filled type. Located between the detector pairs is a neutron source 30 which is shielded on either side as indicated at 32 to reduce direct neutron bombardment of the detectors. The source 30 preferably is an isotropic, chemical source, such as a conventional Am-Be source, but alternatively may be an accelerator-type source if desired.

For enhanced sensitivity, the far detectors 22 and 28 preferably have larger volumes than the near detectors 24 and 26 and, where gas-filled detectors are used, the gas pressure in the far detectors may be also higher. This compensates for the smaller neutron populations at the far detectors as compared with the neutron populations at the near detectors.

Normally, epithermal neutron detectors will produce smaller count rates than similarly spaced thermal neutron detectors. This is due to the fact that at a given point away from the neutron source at which useful formation information can be obtained, the epithermal neutron population will be smaller, by approximately one order of magnitude, than the thermal neutron population. Consequently, the epithermal neutron detectors 26 and 28 preferably are located closer to the neutron source and have a higher internal gas pressure than the thermal neutron detectors 22 and 24.

Pulses from the neutron detectors are accumulated in appropriate circuitry (not shown), which may be conventional, in order to generate count rate signals indicative of the neutrons detected per second by each of the individual detectors. Alternatively, the neutron detectors and the associated circuitry may generate signals indicative of the total energy deposited in the respective detectors, which is functionally related to the count rate. For convenience, the signals generated by the neutron detectors 22, 24, 26 and 28 will hereinafter be referred to in terms of count rates. These signals are transmitted in a known manner with known equipment to a surface data processing system 34 by the insulated electrical conductors (not shown) located in the armored cable 12 after undergoing various degrees of signal processing and conditioning dependent upon the telemetry equipment provided in the sonde 10 and at the surface.

The data processing system 34 may comprise a digital apparatus such as a PDP-11/34 manufactured by the Digital Equipment Corp., as suitably modified by stored instructions to implement the data processing operations described hereinafter.

In order to reduce the effect of the borehole on the neutrons emitted from the neutron source 30 and detected by the neutron detectors 22, 24, 26 and 28, a decentralizing mechanism, such as a resiliently activated arm 36 physically attached to the sonde 10, forces the sonde 10 against one side wall of the borehole. A transducer 38 preferably is provided in conjunction with the arm 36 to produce a caliper measurement of the borehole diameter. Due to irregularities of the borehole wall, however, the sonde may not be flush against the borehole wall. As illustrated at 40 in FIG. 1, for instance, there may be a gap between the sonde and the borehole wall, resulting in a standoff between the detectors and the borehole wall.

While the sonde 10 is being moved through the borehole 14, an indication of the depth of the sonde in the borehole is provided by a depth determining apparatus, generally indicated at 40, which is responsive to the movement of the cable 12 as it is let out and reeled in by a winch (not shown). The depth determining apparatus 40 is connected to a plotter/recorder 42 by a conventional, well-known, cable-following mechanical linkage 44.

In the data processing system 34, the detector count rate signals undergo a plurality of corrections. The count rate signals are referred to hereinafter and in the drawings as $F_t$ and $N_t$ for the far and near thermal detectors 22 and 28, respectively, and as $N_e$ and $F_e$ for the near and far epithermal detectors, respectively. The first two corrections indicated at boxes 46 and 48 in FIG. 1 are dead time corrections and count rate calibration corrections. These are conventional well-known corrections, the details of which do not comprise a part of the present invention.

The detector count rate signals $F_t$, $N_t$, $N_e$ and $F_e$ are then further corrected, in accordance with the present invention, for borehole mud effects. This correction is indicated at box 50 and is applied in order to account for the different neutron moderating and thermal neutron absorbing characteristics of the borehole mud as compared with reference (fresh) water. According to the invention, this correction is a function of the hydrogen index (HI) of the mud. Hydrogen index is defined as the number of hydrogen atoms per unit volume relative to that of freshwater at standard temperature and pressure (75° F., 15 psi). Thus the hydrogen index for freshwater is taken as 1.0 and values of HI for other fluids are referenced to this value. The mud hydrogen index is a function of mud weight (density), salinity, temperature and pressure, and is a measure of the effectiveness of the borehole mud as a neutron moderator relative to freshwater.

Temperature and pressure effects on the hydrogen index are small and tend to be self-cancelling. As will be understood by one skilled in the art, an increase in formation temperature, everything else being equal, will tend to decrease the HI due to thermal expansion while the usual accompanying increase in hydrostatic pressure, all else taken as equal, will tend to increase the HI a similar amount due to compression.

Values of HI for various, commonly used muds are plotted in FIG. 3 as a function of mud weight. The HI values for each mud type are entered in a look-up table in the data processor 34 for input to the HI correction element 50 for use in determining the hydrogen index correction as hereinafter described.

Alternatively, the HI (at 75° and 15 psi) may be calculated on-line in accordance with the following relationship:

$$HI = (1 - 0.11\ PS)(1.286 - 0.0384\ (MW - 1.67\ PS)) \quad (1)$$

where

PS is the mud salinity $S_M$(ppm of NaCl) relative to the salinity of saturated saltwater, i.e., $S_M/260{,}000$; and MW is the mud weight (lbs/gal).

The mud weight will be known from the wellsite data. The value of PS may be determined by measuring the resistivity (Rmf) of a sample of the drilling mud filtrate. It is also necessary to know the mud temperature (MT) at which Rmf is measured.

The Rmf at the mud temperature MT must then be converted to Rmf at 75°. This can be done in accordance with the expression:

$$Rmf_{75} = \frac{(MT + 7)}{82}\ Rmf_{MT} \quad (2)$$

where $Rmf_{75}$ is the mud resistivity at 75° F.; and $Rmf_{MT}$ is the mud resistivity at mud temperature.

From $Rmf_{75}$, the salinity of the mud ($S_M$, in ppm) may be obtained from conventional, published charts such as GEN-9 in the Schlumberger 1972 Chartbook. Alternatively, $S_M$ can be calculated from:

$$S_M(\text{ppm of NaCl}) = 10^{(3.722 + LOGR(0.06241 \times LOGR - 1.070))} \quad (3)$$

where $LOGR = \log_{10} Rmf_{75}$.

Havin $S_M$, PS may be readily calculated (see above), and from Eq. (1) the HI at 75° may then be determined for use in deriving the hydrogen index correction.

At this point, the HI of the mud at formation temperature and pressure can be computed from appropriate charts or tabulations, but since the net effect of these corrections is relatively small, as mentioned previously, only approximate values of temperature and pressure are required. Formation temperature can be estimated from the following expression:

$$FT(°F.) = \frac{GD}{100} + 75 \quad (4)$$

where

G is the geothermal gradient in units of °F. per 100 feet; and

D is the depth below the surface in feet.

Hydrostatic pressure can be determined from the expression:

$$FP\ (psia) = (0.052\ MW \times D) + 15 \quad (5)$$

where

MW is mud weight in lbs./gal.; and

D is depth in feet.

HI at depth D and formation temperature FT is then obtained from the previously determined value at 75° F. multiplied by the small volumetric correction factor obtained from pressure temperature tabulations.

The next correction applied to the count rate signals is a borehole diameter correction, illustrated by element 52. This correction is preferably made in the manner described in U.S. patent application Ser. No. 300,418, now U.S. Pat. No. 4,423,323, the pertinent portions of which are hereby incorporated into the present application.

Following the borehole diameter correction in element 52, the count rate signals $F_t$, $N_t$, $N_e$ and $F_e$ may be processed in any suitable way to generate a measurement of a formation characteristic of interest. Preferably, the signals are applied to porosity and standoff circuitry 54 for deriving a thermal-neutron porosity signal from $N_t$ and $F_t$ and/or deriving an epithermal-neutron porosity signal from $N_e$ and $F_e$ and for determining a filtered value of tool standoff (S.O.) from the borehole wall. These measurements are preferably made in accordance with the disclosure of U.S. patent application Ser. No. 300,418, now U.S. Pat. No. 4,423,323, the pertinent portions of which are hereby incorporated into this application.

Alternatively, the count rate signals $F_t$, $N_t$, $N_e$ and $F_e$ could be processed according to prior known porosity techniques, as disclosed, for example, in the Tixier U.S. Pat. No. 3,566,117 or the Locke U.S. Pat. No. 3,483,376.

The porosity signal or signals, $\Phi_t$ and/or $\Phi_e$, generated by element 54 and the filtered value of standoff (S.O.) are applied as inputs to the plotter/recorder 42. Tangible representations of these signals as functions of the depth of the sonde in the borehole are produced in the conventional way by the plotter/recorded 42 acting in association with the depth determining apparatus 40 through mechanical linkage 44. The S.O. signal is also applied as an input to the hydrogen index correction element 50.

Figure 2:
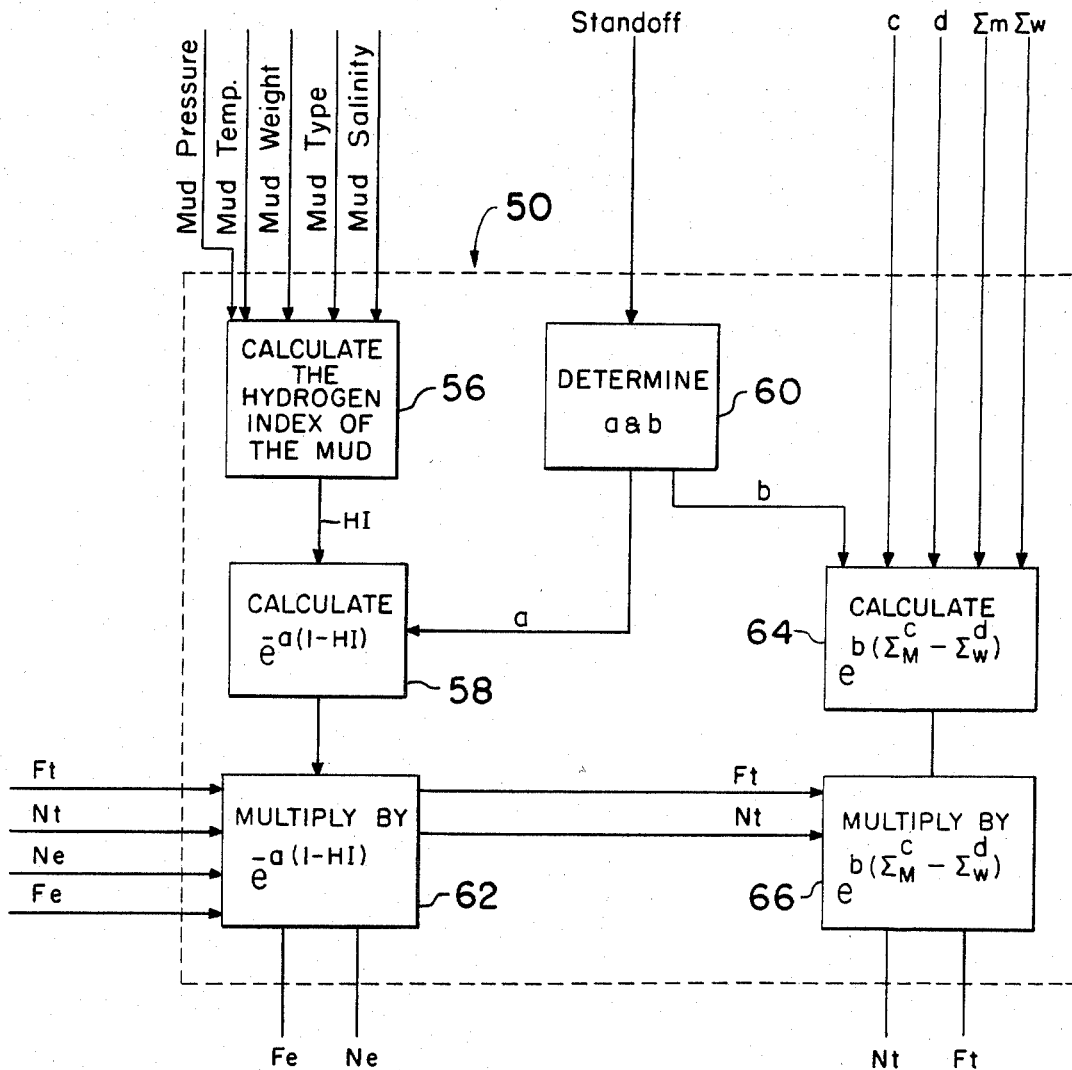
FIG. 2 is a schematic design in functional block diagram form illustrating the derivation of mud effect corrections in accordance with the invention.

FIG. 2 illustrates how the count rate signals from the respective neutron detectors are compensated for the different neutron moderating and thermal neutron absorbing characteristics of the borehole mud as compared with reference water. As noted, it has been determined that mud weight, salinity, temperature and pressure all influence the hydrogen index of the mud borehole, which in turn influences both epithermal and thermal detector count rates. In addition, thermal absorbers in the mud also influence thermal count rates. Experiments have established that corrections for these effects can be made according to the following relationships:

$$CR_W = CR_M e^{-a(1-HI)} \quad (6)$$

for epithermal count rates, and $$CR_W = CR_M e^{-a(1-HI) + b(\Sigma_M c - \Sigma_W d)} \quad (7)$$

for thermal count rates, where:

$CR_W$ is the count rate corrected to the effective count rate with fresh water in the borehole, $CR_M$ is the measured count rate with mud in the borehole (i.e., $N_t$, $F_t$, $N_e$ and $F_e$ in FIG. 1), HI is the hydrogen index of the mud (as determined from FIG. 3 or in accordance with Eq. (1)),
$\Sigma_M$ is the thermal neutron absorption cross section of the mud,
$\Sigma_W$ is the thermal neutron absorption cross section of fresh water, and
a, b, c and d are empirically determined fitting constants.

The $e^{-a(1-HI)}$ term in Eqs. (6) and (7) corrects for standoff and hydrogen index effects, which affects both epithermal and thermal count rates. Hence the term appears in both equations. However, an additional correction must be made to the thermal count rates to account for the difference in thermal neutron absorption between the borehole mud and reference water. This correction is made by the exponential term $b(\Sigma_M{}^c - \Sigma_W{}^d)$ in Eq. (7). Epithermal count rates need not be compensated in this way since thermal neutron absorbing nuclei in the borehole fluid do not significantly affect the epithermal neutron population.

The values of $\Sigma_M$ and $\Sigma_W$ will ordinarily be known or may be readily determined, as, for example, by calculation based on the elemental composition of the respective fluids or by direct measurement. The $\Sigma_M$ and $\Sigma_W$ values are stored in the processing system 34 for input to element 50, as indicated in FIGS. 1 and 2.

The value of the fitting constant a varies with the source-detector spacing and the sonde standoff (S.O.) and with the type of detector, i.e., epithermal or thermal. Quantitative values of a are obtained by a series of carefully controlled measurements in laboratory borehole rock formations. For epithermal detectors, experiments have shown that the a values given in Table I below satisfactorily correct count rate measurements made in a mud filled borehole to the reference conditions, i.e., freshwater borehole at 75° and 15 psi, for typical near and far detector spacings.

TABLE I

| Standoff | a Value | |
|---|---|---|
| | Near Detector | Far Detector |
| 0" | 0.60 | 0.76 |
| 1" | 0.93 | 1.26 |

The a values are stored in the data processor 34 as a look-up table. Values of a for intermediate or greater standoff magnitudes may be derived by interpolation or extrapolation, as the case may be. Either step may be readily carried out in the data processor in a known manner.

For thermal neutron detectors at typical spacings from the source, the preferred values of the fitting constants a and b for the near and far-spaced detectors, as determined by laboratory experiments, are as given in Table II below.

TABLE II

| Standoff | Near-spaced detector | | Far-spaced detector | |
|---|---|---|---|---|
| | a | b | a | b |
| 0" | 0.49 | 0.77 | 0.57 | 0.71 |
| 1" | 0.78 | 1.16 | 0.89 | 1.10 |

Although the a and b values vary somewhat with borehole size, the Table II values representing the response in 8" boreholes, such variation is relatively small. The exponents c and d may each be set equal to 0.2, which has been found appropriate for the borehole environment. These values of a, b, c and d are likewise stored in the data processor 34 for input to element 52.

As shown in FIG. 2, element 56 within the hydrogen index correction element 50 determines the HI value from the look-up table embodying FIG. 3 based on the mud weight and type inputs or, alternatively, calculates it in accordance with Eq. (1) based on the inputs of mud weight, temperature and salinity. The HI value is supplied by element 56 as one input to the element 58, the second input to which is the constant a. The specific value of a used is selected by the look-up element 60 as a function of the detector type and spacing and the magnitude of the standoff (S.O.). For this purpose, the S.O. signal generated by the element 54 in FIG. 1 is supplied to the look-up element 60. Element 60 then selects from Table I, in the case of epithermal detectors, or from Table II, in the case of thermal detectors, an a value for the near-spaced detectors 24 and 26 and an a value for the far-spaced detectors 24 and 28.

Element 58 operates on the HI signal and the a constant signal to calculate the hydrogen index correction to be applied to the detector count rate signals. Specifically, the correction generated by element 58 is that set out in Eq. (6). The hydrogen index correction is supplied as an input to element 62, where the count rate signals $F_t$, $N_t$, $N_e$ and $F_e$ from all four neutron detectors 22, 24, 26, 28, respectively, are multiplied by the hydrogen index correction to produce corrected count rate signals.

The fully-corrected epithermal neutron count rate signals $N_e$ and $F_e$ are thereafter supplied to the porosity determination circuit, as shown in FIG. 1, for determining $\Phi_e$. As explained above, however, the thermal neutron count rate signals must additionally be corrected for the presence of thermal neutron absorbers in the borehole mud.

This additional correction is generated by the element 64 in FIG. 2. For this purpose the look-up element 60 also selects values of b as a function of standoff and detector spacing, and supplies these values to the element 64. The values of c, d, $\Sigma_M$ and $\Sigma_W$ are also applied as inputs to element 64 which, based thereon and on the b values, carries out the computation set out in the second exponential term in Eq. (7). The resulting correction signals (one for each near-spaced detector and one for each far-spaced detector) are then supplied as one input to the element 66 for multiplication of the partially-corrected thermal detector count rate signals $N_t$ and $F_t$ from element 62. The fully-corrected thermal neutron count rate signals may then be supplied to the porosity and standoff circuitry 54 of FIG. 1 to determine porosity $\Phi_t$.

Although the invention has been described herein with respect to a specific embodiment thereof, it will be understood that various modifications and variations may be made thereto without departing from the inventive concepts disclosed. For example, instead of operating on-line at the well site, the signal processing system 34 could operate on previously recorded count rate and standoff data, and the mud-effect corrections described above generated at a remote site. Also, although the invention has been described and illustrated herein in an open hole, it will be understood to have application to cased hole investigations as well. All such modifications and variations, therefore, are intended to be included within the spirit and scope of the appended claims.

I claim:

1. A method for investigating an earth formation surrounding a mud-filled borehole, which comprises the steps of:
   passing a logging tool, including a high energy neutron source and at least one pair of neutron detectors spaced at different distances from the neutron source, through the borehole;
   irradiating the borehole contents and the formation with neutrons from said source;
   detecting neutrons that interact with the borehole contents and the formation with said detectors;
   producing a signal indicative of the neutrons detected by each detector;
   determining a measure of the effectiveness of the borehole mud as a neutron moderator; and
   applying to each said detector signal a correction that is a function of the measure of the effectiveness of the borehole mud as a neutron moderator to produce a corrected signal.

2. The method of claim 1, wherein the measure of the effectiveness of the borehole mud as a neutron moderator determined is a hydrogen index of the borehole mud.

3. The method of claim 2, wherein the step of determining the hydrogen index of the borehole mud comprises the steps of:
   determining at least the salinity and weight of the borehole mud; and
   combining at least said salinity and weight determinations to determine the hydrogen index of the borehole mud.

4. The method of claim 3, wherein:
   said at least one pair of neutron detectors comprise epithermal neutron detectors;
   each said detector signal is an epithermal neutron signal; and
   the correction applied to each said epithermal neutron signal is equal to $$e^{-a(1-HI)}$$

where a is an empirically determined constant functionally related to source-detector spacing and logging tool standoff from the borehole wall and HI is the hydrogen index of the borehole mud.

5. The method of claim 4, which comprises the additional step of using the corrected epithermal neutron signals to produce a signal indicative of porosity of the formation.

6. The method of claim 4, which comprises the additional steps of:
   using the corrected epithermal neutron signals to produce a signal indicative of logging tool standoff; and
   using the signal indicative of logging tool standoff to select the value of a used in determining the correction to the epithermal neutron signals.

7. The method of claim 3, wherein:
   said at least one pair of neutron detectors comprise thermal neutron detectors;
   each said signal indicative of the neutrons detected is a thermal neutron signal; and
   the correction applied to the thermal neutrons signals is equal to $$e^{-a(1-HI)+b(\Sigma_M c - \Sigma_W d)}$$

where a is an empirically determined constant functionally related to source-detector spacing and logging tool standoff from the borehole wall, HI is the hydrogen index of the borehole mud, $\Sigma_M$ is the thermal neutron absorption cross section of the borehole mud, $\Sigma_W$ is the thermal neutron absorption cross section of reference water, and b, c, and d are empirically determined fitting constants.

8. The method of claim 7, which comprises the additional step of using the corrected thermal neutron signals to produce a signal indicative of porosity of the formation.

9. The method of claim 5 or 8, which comprises the additional step of recording the signal indicative of porosity as a function of depth of the logging tool in the borehole.

10. An apparatus for investigating an earth formation surrounding a mud-filled borehole, which comprises:
    a logging tool adapted to be passed through the borehole;
    means in said logging tool for irradiating the borehole contents and the formation with high energy neutrons;
    first and second means in said logging tool spaced at first and second distances from said neutron irradiating means for detecting neutrons that interact with the borehole contents and the formation and for producing first and second signals indicative thereof;
    means for determining a measure of the effectiveness of the borehole mud as a neutron moderator; and
    means for applying to each of said first and second signals a correction that is a function of the measure of the effectiveness of the borehole mud as a neutron moderator to produce first and second corrected signals.

11. The apparatus of claim 10, wherein said measure of the effectiveness of the borehole mud as a neutron moderator is a hydrogen index of the borehole mud.

12. The apparatus of claim 11, wherein the means for determining the hydrogen index of the borehole mud comprises means for combining measures of at least the salinity and weight of the borehole mud to determine the hydrogen index of the borehole mud.

13. The apparatus of claim 12, wherein:
    said first and second neutron detecting means comprise epithermal neutron detectors;
    said first and second signals are epithermal neutron signals; and
    the correction applied to each said epithermal neutron signal is equal to $$e^{-a(1-HI)}$$

where a is an empirically determined constant functionally related to source-detector spacing and logging tool standoff from the borehole wall and HI is the hydrogen index of the borehole mud.

14. The apparatus of claim 13, additionally comprising means for deriving a signal indicative of porosity of the formation from said corrected first and second epithermal neutron signals.

15. The apparatus of claim 13, additionally comprising:
    means for deriving a signal indicative of logging tool standoff from said corrected epithermal neutron signals; and
    means for selecting the value of a as a function of said signal indicative of logging tool standoff.

16. The apparatus of claim 12, wherein:

said first and second neutron detecting means comprise thermal neutron detectors;

said first and second signals are thermal neutron signals; and the correction applied to each said thermal neutron signal is equal to $$e^{-a(1-HI)+b(\Sigma_M c - \Sigma_W d)}$$

where a is an empirically determined constant functionally related to source-detector spacing and logging tool standoff from the borehole wall, HI is the hydrogen index of the borehole mud, $\Sigma_M$ is the thermal neutron absorption cross section of the borehole mud, $\Sigma_W$ is the thermal neutron absorption cross section of reference water, and b, c, and d are empirically determined fitting constants.

17. The apparatus of claim 16, additionally comprising means for deriving a signal indicative of porosity of the formation from said corrected first and second thermal neutron signals.

18. The apparatus of claim 14 or 17, additionally comprising means for recording the signal indicative of porosity as a function of depth of the logging tool in the borehole.

19. A method for investigating an earth formation surrounding a mud-filled borehole from representations of neutrons detected at at least two spaced locations in the borehole following irradiation of the borehole contents and the formation with high energy neutrons, which comprises the steps of:

determining a measure of the effectiveness of the borehole mud as a neutron moderator;

deriving a correction that is functionally related to said measure of the effectiveness of the borehole mud as a neutron moderator; and applying said correction to a representation of the neutrons detected at each of said spaced locations in said borehole to produce corrected representations.

20. The method of claim 19, wherein the measure of the effectiveness of the borehole mud as a neutron moderator determined is a hydrogen index of the borehole mud.

21. The method of claim 20, wherein the step of determining the hydrogen index of the borehole mud comprises the steps of:

determining at least the salinity and weight of the borehole mud; and combining at least said salinity and weight determinations to determine the hydrogen index of the borehole mud.

22. The method of claim 21, wherein:

said at least two representations of neutrons detected are representation of epithermal neutrons detected; and the correction applied to each said representation of epithermal neutrons detected is equal to $$e^{-a(1-HI)}$$

where a is an empirically determined constant functionally related to source-detector spacing and logging tool standoff from the borehole wall and HI is the hydrogen index of the borehole mud.

23. The method of claim 22, which comprises the additional step of using said corrected epithermal neutron representations to produce a representation indicative of porosity of the formation.

24. The method of claim 22, which comprises the additional steps of:

using the corrected epithermal neutron representations to produce a representation indicative of logging tool standoff; and using the signal indicative of logging tool standoff to select the value of a used in determining the correction to each epithermal neutron signal.

25. The method of claim 21, wherein:

said at least two representations of neutrons detected are representations of thermal neutrons detected; and the correction applied to each said representation of thermal neutrons detected is equal to $$e^{-a(1-HI)+b(\Sigma_M c - \Sigma_W d)}$$

where a is an empirically determined constant functionally related to source-detector spacing and logging tool standoff from the borehole wall, HI is the hydrogen index of the borehole mud, $\Sigma_M$ is the thermal neutron absorption cross section of the borehole mud, $\Sigma_W$ is the thermal neutron absorption cross section of reference water, and b, c, and d are empirically determined fitting constants.

26. The method of claim 25, which comprises the additional step of using the corrected thermal neutron representations to produce a representation indicative of porosity of the formation.

27. The method of claim 23 or 26, which comprises the additional step of recording a representation indicative of porosity as a function of depth of the logging tool in the borehole.

28. An apparatus for investigating an earth formation surrounding a mud-filled borehole from representations of neutrons detected at at least two spaced locations in the borehole following irradiation of the borehole contents and the formation with high energy neutrons, which comprises:

means for determining a measure of the effectiveness of the borehole mud as a neutron moderator;

means for deriving a correction that is functionally related to said measure of the effectiveness of the borehole mud as a neutron moderator; and means for applying said correction to a representation of the neutrons detected at each of said spaced locations in said borehole to produce corrected representations.

29. The apparatus of claim 28, wherein said measure of the effectiveness of the borehole mud as a neutron moderator is a hydrogen index of the borehole mud.

30. The apparatus of claim 29, wherein the means for determining the hydrogen index of the borehole fluid comprises means for combining measures of at least the salinity and weight of the borehole mud to determine the hydrogen index of the borehole mud.

31. The apparatus of claim 29, wherein:

said at least two representations of neutrons detected are representations of epithermal neutrons detected; and the correction applied to each said representation of epithermal neutrons detected is equal to $$e^{-a(1-HI)}$$

where a is an empirically determined constant functionally related to source-detector spacing and logging tool standoff from the borehole wall and HI is the hydrogen index of the borehole mud.

32. The apparatus of claim 31, additionally comprising means for deriving a representation indicative of porosity of the formation from said corrected epithermal neutron representations.

33. The apparatus of claim 31, additionally comprising:
means for deriving a representation indicative of logging tool standoff from said corrected epithermal neutron representations; and
means for selecting the value of a as a function of the representation indicative of logging tool standoff.

34. The apparatus of claim 29, wherein:
said at least two representations of neutrons detected are representations of thermal neutrons detected; and
the correction applied to each said representation of thermal neutrons detected is equal to $$e^{-a(1-HI)+b(\Sigma_M c - \Sigma_W d)}$$

where a is an empirically determined constant functionally related to source-detector spacing and logging tool standoff from the borehole wall, HI is the hydrogen index of the borehole mud, $\Sigma_M$ is the thermal neutron absorption cross section of the borehole mud, $\Sigma_W$ is the thermal neutron absorption cross section of reference water, and b, c, and d are empirically determined fitting constants.

35. The apparatus of claim 34, additionally comprising means for deriving a representation indicative of porosity of the formation from said corrected thermal neutron representations.

36. The apparatus of claim 32 or 35, additionally comprising means for recording a representation of porosity as a function of depth of the logging tool in the borehole.

* * * * *